United States Patent [19]
Rodriguez

[11] Patent Number: 5,138,525
[45] Date of Patent: Aug. 11, 1992

[54] MULTI-PURPOSE STRUT FOR DIGITAL COMPUTER CHASSIS

[75] Inventor: Robert G. Rodriguez, San Antonio, Tex.

[73] Assignee: Dell USA Corporation, Austin, Tex.

[21] Appl. No.: 715,361

[22] Filed: Jun. 14, 1991

[51] Int. Cl.$^5$ .................. H05K 7/02; H05K 9/00; A47B 77/08

[52] U.S. Cl. .................. 361/390; 312/223.2; 361/424

[58] Field of Search .......... 248/49, 68.1; 364/708; 312/265.1, 265.3, 194, 223, 264, 342, 345; 361/334, 390, 391, 395, 415, 429, 424; 174/48

[56] References Cited

U.S. PATENT DOCUMENTS

| | | | |
|---|---|---|---|
| 1,189,208 | 6/1916 | Hadkinson | 248/68.1 X |
| 4,094,256 | 6/1978 | Holper et al. | 312/223 X |
| 4,184,599 | 1/1980 | Drake et al. | 361/415 X |
| 4,272,136 | 6/1981 | Sengua | 312/223 X |
| 4,503,484 | 3/1985 | Moxon | 361/395 |
| 4,542,871 | 9/1985 | Fortsch | 248/68.1 X |
| 4,742,477 | 5/1988 | Phillips et al. | 364/708 |
| 4,748,540 | 5/1988 | Henneberg et al. | 361/424 |
| 4,947,288 | 8/1990 | Olsson et al. | 361/415 X |
| 5,031,070 | 7/1991 | Hsu | 361/380 |

FOREIGN PATENT DOCUMENTS

| | | | |
|---|---|---|---|
| 3239083 | 4/1984 | Fed. Rep. of Germany | 312/223 |
| 2636511 | 3/1990 | France | 312/223 |

Primary Examiner—Leo P. Picard
Assistant Examiner—Michael W. Phillips
Attorney, Agent, or Firm—Thomas G. Devine

[57] ABSTRACT

A digital computer chassis has a front and rear wall with a strut fastened to both the front and rear walls, positioned to strengthen the chassis. A power supply and a hard disk drive are located within the chassis and connected to and supported by the strut. The power cable from the power supply is positioned within a channel formed in the strut, terminating in an on/off switch. The power cable is shielded from the electrical components within the chassis by the strut. With the surrounding cover in place, a monitor may be placed on the cover, supported by the strut.

6 Claims, 2 Drawing Sheets

MULTI-PURPOSE STRUT FOR DIGITAL COMPUTER CHASSIS

BACKGROUND OF THE INVENTION

1. Field of the Invention

This invention relates to a digital computer chassis, more specifically it relates to a computer chassis having a multi-purpose strut.

2. Description of the Related Art

In the past, digital computers (more specifically desk top personal computes) did not incorporate a multi-purpose strut in their chassis. The structural strength of the cover was sufficient to support the monitor. The power supply and hard disk drive were supported on separate brackets. The power cable was wrapped in a metallic sheath to reduce radiation.

This invention enables supporting the monitor, the power supply, the hard drive and further supports and shields the power cable, In addition, the multi-purpose strut strengthens the chassis.

BRIEF SUMMARY OF THE INVENTION

A digital computer (a desk top personal computer in this preferred embodiment) has a chassis in which the electronic components o the computer are housed. The chassis has a front and a rear wall. A multi-purpose strut is connected to the front wall and to the rear wall, positioned to add rigidity to the chassis. The hard disk drive of the computer is supported by the strut. Also, the power supply is supported by the strut. The power cable from the power supply, terminating in an on off switch, is routed through a channel formed in the strut, thereby shielding the -power cable and reducing radiation.

The principle object of this invention is to provide a multi-purpose strut for the chassis of a digital computer to enable supporting certain of the electrical components and to enable supporting the computer monitor on top of the chassis.

DETAILED DESCRIPTION OF THE INVENTION

Figure 1:
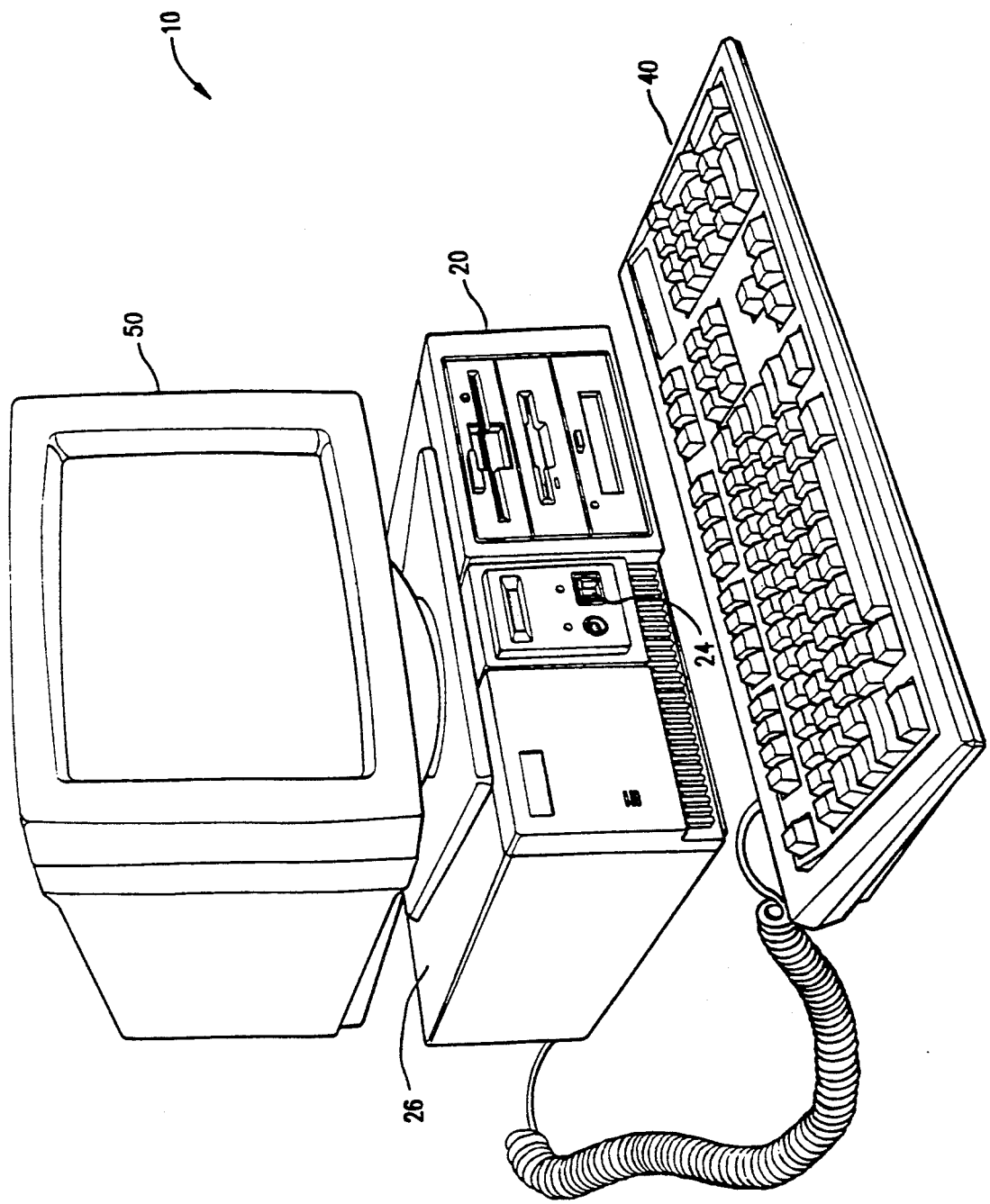
FIG. 1 is a perspective drawing of the digital computer of this invention.
Figure 2:
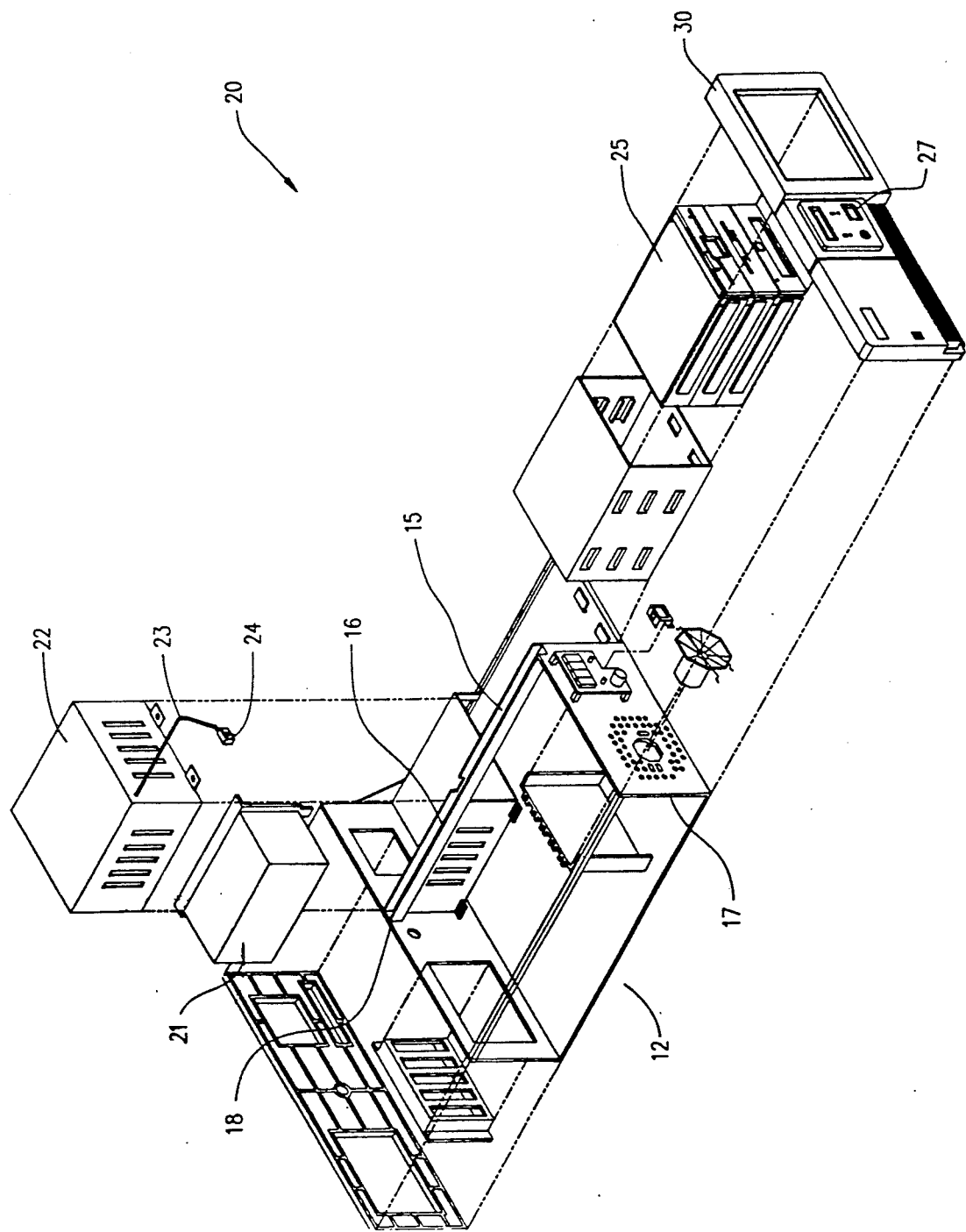
FIG. 2 is an exploded view of the chassis in certain components of the digital computer.

FIG. 1 illustrates digital computer 10 having keyboard 40, computer unit 20 having cover 26, and monitor 50. Monitor 50 rests on cover 26 which in turn is supported by multi-purpose strut 15, shown in FIG. 2.

Multi-purpose strut 15 is shown connected to front wall 17 and rear wall 18. Channel 16 is shown formed within strut 15, hard disk drive 21 and power supply 22 are both connected to and supported by strut 15, as shown. Power cord 23 fits within channel 16 with on/-off switch 24 fitting into aperture 27 in front bezel 30. Chassis 12 is made more rigid by the addition of multi-purpose strut 15.

In summary, it can be seen that multi-purpose strut 15 enables the placing of monitor 50 on top of computer unit 20, supports both the hard disk drive 21 and power supply 22, and provides shielding for power cord 23.

Those skilled in the art can vary the shapes, forms and numbers of components without departing from the spirit and scope of this invention which is limited only by the appended claims.

The invention claimed is:

1. A digital computer system comprising:
 (a) a chassis having a front and rear wall;
 (b) a multi-purpose strut including the shape of a channel open to the top of said chassis, said multi-purpose strut fastened to the front wall and to the rear wall, positioned to reinforce the chassis, wherein said multi-purpose strut is positioned approximately at the center top edge of said rear wall, and extends orthogonally therefrom to connect at the top edge of said front wall; and
 (c) a power supply, connected to and supported by the multi-purpose strut.

2. The system of claim 1, further comprising a hard disc drive, connected to and supported by said multi-purpose strut.

3. The system of claim 1 further comprising a power cable, connected to and supported by said multi-purpose strut.

4. The system of claim 3 wherein said power cable is positioned within said channel to suppress radiation therefrom 5. The system of claim 4 further comprising:
 (d) a motor; and
 (e) a cover positioned over said multi-purpose strut upon which said monitor is placed.

6. The system of claim 1 further comprising:
 (d) a monitor; and
 (e) a cover positioned over said multi-purpose strut upon which said monitor is placed.

* * * * *